March 29, 1949.　　F. N. P. SUPPLEE　　2,465,762

STERILIZER FOR ROOM ATMOSPHERES

Filed July 11, 1945

WITNESS:
Rob P. Mitchel.

INVENTOR
Franklin N. P. Supplee
BY Augustus B. Stoughton
ATTORNEY.

Patented Mar. 29, 1949

2,465,762

UNITED STATES PATENT OFFICE 2,465,762

STERILIZER FOR ROOM ATMOSPHERES

Franklin N. P. Supplee, Philadelphia, Pa.

Application July 11, 1945, Serial No. 604,490

1 Claim. (Cl. 21—120)

The principal objects of the present invention are to provide an efficient applicator for the introduction of sterilizing vapors or the like into the atmosphere of rooms, compartments and the like for the purpose of sterilizing the same; to provide a satisfactory wick or like device for introducing the volatile components of a liquid sterilizer into the atmosphere of a sick room or the like for the purpose of sterilizing or destroying obnoxious germs; to provide means for efficiently and satisfactorily volatilizing disinfecting material and introducing the volatilized fumes or vapors into the interior of an apartment or the like in such a way that the atmosphere thereof is made comparatively sterile and free from disease and other germs.

Other objects of the invention will appear from the following description at the end of which the invention will be claimed.

Generally stated the invention comprises the improvements to be presently described and illustrated in the accompanying drawing forming part hereof and in which.

Figure 2:
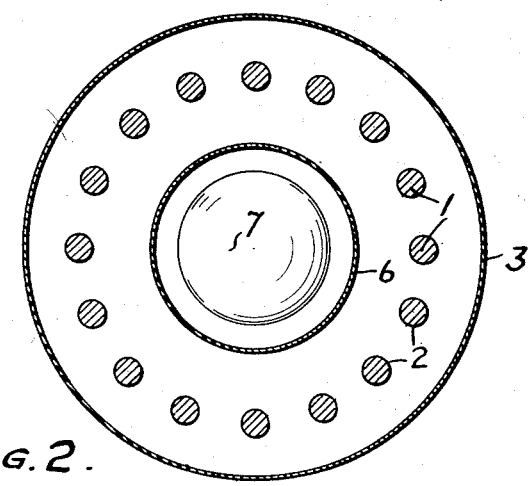
Figure 2 is a transverse sectional view taken on the line 2—2 of Figure 1.
Figure 1:
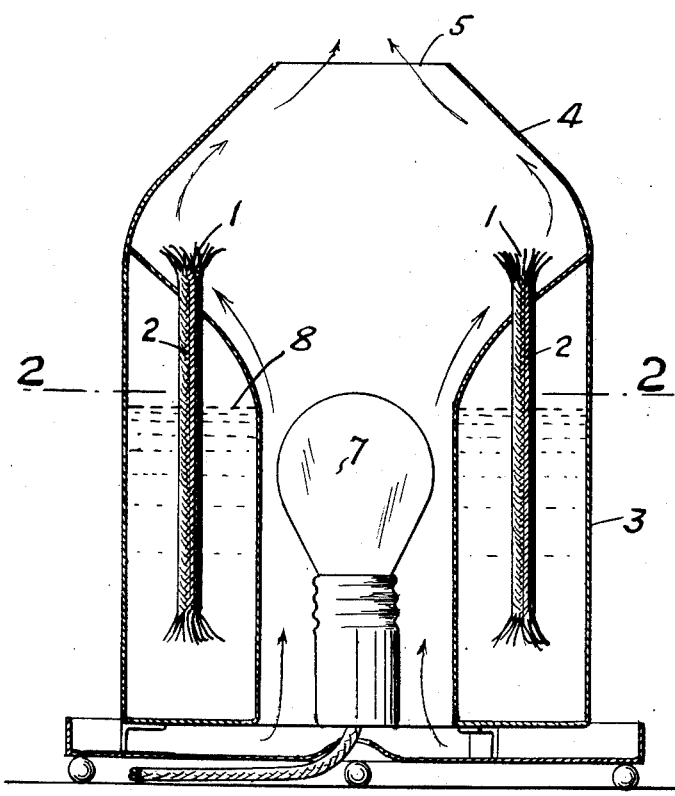
Figure 1 is a central section illustrating an applicator of the invention.
Figure 3:
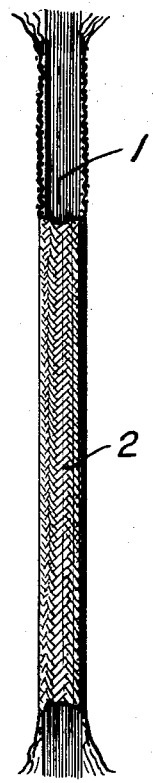
Figure 3 is an enlarged view illustrating features of the invention.

Referring to the drawings, the wick 1 is of generally circular cross section and it comprises a bundle of generally parallel bunches of elongated glass fibers. Around the bundle of elongated glass fibers is shown a jacket 2 of similar braided glass fibers. At the ends of the jacket the bunches of glass fibers are exposed. Generally stated the bunches of glass fibers extend throughout the length of the wick. The action of the wick is by capillarity and glass fibers as described are satisfactory but fibers of other material having the same characteristics may be employed. 3 is a casing of circular cross section and having a dome shaped upper portion 4 provided with an outlet 5. Internally the casing is provided with an annular partition 6 of circular cross section and having a generally funnel shaped mouth and a circular stem. The bottom plate of the casing is of ring shape and closes the lower portion of the casing leaving an inlet for air through the stem of the funnel portion and into the mouth of the funnel adjacent the upper ends of the wick and through the opening through the top of the dome. Located in the funnel portion is an incandescent lamp or similar heater 7. 8 indicates a supply of fluid which by capillary action is carried to the upper ends of the wicks and there volatilized and heat from the lamp 7 assists in volatilization either by direct radiation or by reflection. A circular group of wicks in spaced relation are shown and the number may be increased or diminished.

I claim:

An apparatus for introducing sterilizing vapors and the like into the atmosphere of a room or other such enclosed space comprising, in combination, a main external casing having a centrally apertured dome-shaped top, a vertically disposed air flue disposed internally of said main casing and having a central passage open to atmosphere at its top and bottom ends, said flue being secured to said casing to provide an annular chamber adapted to receive a supply of a volatilizable fluid, the top end of said air flue being outwardly flared to provide said chamber with a circumferentially continuous inclined top wall extending at an obtuse angle to the adjoining dome-shaped top of the casing, a heating element disposed centrally of said air flue for creating an updraft of heated air through said air flue and over said inclined top wall of said fluid chamber, and a plurality of individually removable capillary wicks spaced circumferentially about said inclined top wall and supported thereby for projection of their lower extremities into the fluid contained in said chamber, said wicks being characterized in that each consists of a bundle of glass fibres disposed in closely associated parallel relation, the upper ends of the fibres composing each wick being exposed to the heated air passing upwardly through said flue and over said inclined top wall of the fluid chamber, whereby to increase the capillary action of said wicks for release of the volatized products of said fluid.

FRANKLIN N. P. SUPPLEE.

REFERENCES CITED

The following references are of record in the file of this patent:

UNITED STATES PATENTS

| Number | Name | Date |
|---|---|---|
| 1,246,247 | Dorment | Nov. 13, 1917 |
| 1,706,939 | Rosenthal | Mar. 26, 1929 |